United States Patent
Zhang et al.

(10) Patent No.: US 12,235,030 B2
(45) Date of Patent: Feb. 25, 2025

(54) COMPRESSOR RETURN GAS DRYNESS DETECTION METHOD, APPARATUS, DEVICE, AND STORAGE MEDIUM

(71) Applicants: GD Midea Heating & Ventilating Equipment Co., Ltd., Foshan (CN); Midea Group Co., Ltd., Foshan (CN)

(72) Inventors: Yusheng Zhang, Foshan (CN); Kebi Chen, Foshan (CN); Yunxiao Ding, Foshan (CN)

(73) Assignees: GD MIDEA HEATING & VENTILATING EQUIPMENT CO., LTD., Foshan (CN); MIDEA GROUP CO., LTD., Foshan (CN)

( * ) Notice: Subject to any disclaimer, the term of this patent is extended or adjusted under 35 U.S.C. 154(b) by 233 days.

(21) Appl. No.: 17/992,820

(22) Filed: Nov. 22, 2022

(65) Prior Publication Data
US 2023/0079856 A1 Mar. 16, 2023

Related U.S. Application Data

(63) Continuation of application No. PCT/CN2021/115723, filed on Aug. 31, 2021.

(30) Foreign Application Priority Data

Dec. 4, 2020 (CN) .......................... 202011415969.7

(51) Int. Cl.
*F25B 49/02* (2006.01)

(52) U.S. Cl.
CPC ........ *F25B 49/022* (2013.01); *F25B 2600/02* (2013.01); *F25B 2700/151* (2013.01);
(Continued)

(58) Field of Classification Search
CPC ................ F25B 49/022; F25B 2600/02; F25B 2700/151; F25B 2700/1931;
(Continued)

(56) References Cited

U.S. PATENT DOCUMENTS

2016/0018148 A1   1/2016 Yura

FOREIGN PATENT DOCUMENTS

| CN | 201387379 Y  | 1/2010 |
| CN | 103032996 A  | 4/2013 |

(Continued)

OTHER PUBLICATIONS

WO 2020/208736 (English translation) (Year: 2020).*

(Continued)

*Primary Examiner* — Jonathan Bradford
(74) *Attorney, Agent, or Firm* — Morgan, Lewis & Bockius LLP

(57) ABSTRACT

A compressor return gas dryness detection method includes: obtaining an exhaust gas pressure, a return gas pressure, a working frequency, an exhaust gas temperature, and a return gas temperature of a compressor; determining a return gas saturation temperature corresponding to the return gas pressure; calculating a temperature difference value based on the return gas temperature and the return gas saturation temperature; and in accordance with a determination that the temperature difference value is smaller than a predetermined threshold value, calculating a return gas dryness of the compressor based on the exhaust gas pressure, the return gas pressure, the working frequency, and the exhaust gas temperature.

9 Claims, 5 Drawing Sheets

(52) U.S. Cl.
CPC ................ *F25B 2700/1931* (2013.01); *F25B 2700/1933* (2013.01); *F25B 2700/21151* (2013.01); *F25B 2700/21152* (2013.01)

(58) Field of Classification Search
CPC .... F25B 2700/1933; F25B 2700/21151; F25B 2700/21152
See application file for complete search history.

(56) References Cited

FOREIGN PATENT DOCUMENTS

| | | | |
|---|---|---|---|
| CN | 104110367 | A | 10/2014 |
| CN | 104990319 | A | 10/2015 |
| CN | 204880901 | U | 12/2015 |
| CN | 206523459 | U | 9/2017 |
| CN | 209857292 | U | 12/2019 |
| CN | 110864475 | A | 3/2020 |
| CN | 111720901 | A | 9/2020 |
| EP | 2546588 | A1 | 1/2013 |
| EP | 3348939 | A1 | 7/2018 |
| JP | 09119379 | A | 5/1997 |
| JP | 2011226704 | A | 11/2011 |
| JP | 2016183859 | A | 10/2016 |
| WO | WO 2020188753 | A1 | 9/2020 |
| WO | WO 2020208736 | A1 | 10/2020 |

OTHER PUBLICATIONS

Midea Group Co., Ltd., CN Notice of Grant, CN Patent Application No. 202011415969.7, May 2, 2023, 7 pgs.
Midea Group Co., Ltd., WO, PCT/CN2021/115723, Oct. 18, 2021, 4 pgs.
Midea Group Co., Ltd., IPRP, PCT/CN2021/115723, May 30, 2023, 5 pgs.
Midea Group Co., Ltd., Extended European Search Report and Supplementary Search Report, EP 21899647.8, Oct. 25, 2023, 14 pgs.
Midea Group Co., Ltd., ISR, PCT/CN2021/115723, Oct. 18, 2021, 2 pgs.

* cited by examiner

COMPRESSOR RETURN GAS DRYNESS DETECTION METHOD, APPARATUS, DEVICE, AND STORAGE MEDIUM

CROSS-REFERENCE TO RELATED APPLICATIONS

This application is a continuation of PCT Patent Application No. PCT/CN2021/115723, filed Aug. 31, 2021, which claims priority to Chinese Patent Application No. 202011415969.7, filed Dec. 4, 2020, all of which are incorporated herein by reference.

FIELD

The present disclosure relates to the technical field of air conditioning, and more particularly, to a compressor return gas dryness detection method, a compressor return gas dryness detection apparatus, a compressor return gas dryness detection device, and a storage medium.

BACKGROUND

The global warming coefficient (GWP) value of R32 refrigerant is 675, which is 68% lower than the GWP value 2088 of R410a refrigerant. R32 refrigerant has greatly improved environmental friendliness, and is widely used in air conditioners. However, the adiabatic coefficient of R32 refrigerant is high, and the exhaust gas temperature in refrigeration compression cycle is 10 to 20° C. higher than that in R410a cycle. Among the various kinds of technologies for lowering the exhaust gas temperature, the liquid-carrying return gas technology can solve a problem of high exhaust gas temperature without increasing hardware cost. However, the return gas dryness cannot be measured, and if the return gas dryness is too small, the compressor refrigerant oil will be diluted and abnormal wear of the compressor will be caused, which will reduce the reliability of the compressor.

The above content is only used to assist in understanding the technical solution of the present disclosure, and does not mean that the above content is acknowledged as the prior art.

SUMMARY

The present disclosure provides a compressor return gas dryness detection method. The method includes: obtaining an exhaust gas pressure, a return gas pressure, a working frequency, an exhaust gas temperature, and a return gas temperature of a compressor; determining a return gas saturation temperature corresponding to the return gas pressure; calculating a temperature difference value based on the return gas temperature and the return gas saturation temperature; and calculating, in accordance with a determination that the temperature difference value is smaller than a predetermined threshold value, a return gas dryness of the compressor based on the exhaust gas pressure, the return gas pressure, the working frequency, and the exhaust gas temperature.

In some embodiments, the compressor return gas dryness detection method further includes, subsequent to said calculating the temperature difference value based on the return gas temperature and the return gas saturation temperature: determining a predetermined return gas dryness as the return gas dryness of the compressor in accordance with a determination that the temperature difference value is greater than or equal to the predetermined threshold value.

In some embodiments, calculating the return gas dryness of the compressor based on the exhaust gas pressure, the return gas pressure, the working frequency, and the exhaust gas temperature includes: determining an exhaust gas enthalpy value based on the exhaust gas pressure and the exhaust gas temperature; calculating a compression ratio based on the exhaust gas pressure and the return gas pressure, and determining a theoretical enthalpy difference based on the compression ratio; determining an absolute thermal efficiency of the compressor based on the exhaust gas pressure, the return gas pressure, and the working frequency; and calculating the return gas dryness of the compressor based on the exhaust gas enthalpy value, the theoretical enthalpy difference, the absolute thermal efficiency of the compressor, and the return gas pressure.

In some embodiments, calculating the return gas dryness of the compressor based on the exhaust gas enthalpy value, the theoretical enthalpy difference, the absolute thermal efficiency of the compressor, and the return gas pressure includes: calculating a return gas enthalpy value based on the exhaust gas enthalpy value, the theoretical enthalpy difference, and the absolute thermal efficiency of the compressor; searching for a saturated liquid enthalpy value and a saturated gas enthalpy value that correspond to the return gas pressure; and calculating the return gas dryness of the compressor based on the saturated liquid enthalpy value, the saturated gas enthalpy value, and the return gas enthalpy value.

In some embodiments, calculating the return gas dryness of the compressor based on the saturated liquid enthalpy value, the saturated gas enthalpy value, and the return gas enthalpy value includes: calculating, based on the saturated liquid enthalpy value, the saturated gas enthalpy value, and the return gas enthalpy value, the return gas dryness of the compressor in accordance with a predetermined return gas dryness formula:

$$X = (Ht7 - Hpe\_liq)/(Hpe\_gas - Hpe\_liq),$$

where x represents the return gas dryness of the compressor, Ht7 represents the return gas enthalpy value, Hpe_liq represents the saturated liquid enthalpy value, and Hpe_gas represents the saturated gas enthalpy value.

In some embodiments, the compressor return gas dryness detection method further includes, subsequent to said calculating, in response to the temperature difference value being smaller than the predetermined threshold value, the return gas dryness of the compressor based on the exhaust gas pressure, the return gas pressure, the working frequency, and the exhaust gas temperature: generating an adjustment strategy based on the return gas dryness; and adjusting an operation state of the compressor based on the adjustment strategy, to control the return gas dryness of the compressor within a predetermined return gas dryness interval.

In some embodiments, said obtaining the exhaust gas pressure, the return gas pressure, the working frequency, the exhaust gas temperature, and the return gas temperature of the compressor includes: detecting the exhaust gas pressure of the compressor by an exhaust gas pressure sensor, and detecting the return gas pressure of the compressor by a return gas pressure sensor; detecting the exhaust gas temperature of the compressor by an exhaust gas temperature sensor, and detecting the return gas temperature of the compressor by a return gas temperature sensor; and obtaining a rotational speed of the compressor, and determining the working frequency of the compressor based on the rotational speed of the compressor.

The present disclosure further provides a compressor return gas dryness detection apparatus. The compressor return gas dryness detection apparatus includes: a data obtaining module configured to obtain an exhaust gas pressure, a return gas pressure, a working frequency, an exhaust gas temperature, and a return gas temperature of a compressor; a data searching module configured to determine a return gas saturation temperature corresponding to the return gas pressure; a temperature difference value module configured to calculate a temperature difference value based on the return gas temperature and the return gas saturation temperature; and a return gas dryness module configured to calculate, in accordance with a determination that the temperature difference value is smaller than a predetermined threshold value, a return gas dryness of the compressor based on the exhaust gas pressure, the return gas pressure, the working frequency, and the exhaust gas temperature.

The present disclosure further discloses a compressor return gas dryness detection device. The compressor return gas dryness detection device includes a memory; a processor; and a compressor return gas dryness detection program stored on the memory and executable on the processor. The compressor return gas dryness detection program, when executed by the processor, implements steps of the compressor return gas dryness detection method as described above.

The present disclosure further provides a storage medium. The storage medium has a compressor return gas dryness detection program stored thereon. The compressor return gas dryness detection program, when executed by a processor, implements steps of the compressor return gas dryness detection method as described above.

In some embodiments, the exhaust gas pressure, the return gas pressure, the working frequency, the exhaust gas temperature, and the return gas temperature of the compressor may be obtained; the return gas saturation temperature corresponding to the return gas pressure is determined; the temperature difference value is calculated based on the return gas temperature and the return gas saturation temperature; and the return gas dryness of the compressor is calculated based on the exhaust gas pressure, the return gas pressure, the working frequency, and the exhaust gas temperature in response to the temperature difference value being smaller than the predetermined threshold value. In some embodiments, the return gas saturation temperature corresponding to the return gas pressure is determined based on the return gas pressure, the temperature difference value is calculated based on the return gas temperature and the return gas saturation temperature, and the return gas dryness of the compressor may calculated based on the exhaust gas pressure, the return gas pressure, the working frequency, and the exhaust gas temperature in accordance with a determination that the temperature difference value is smaller than the predetermined threshold value. In this way, the return gas dryness of the compressor may be accurately calculated and the accuracy of the detection of the return gas dryness of the compressor may be improved.

The realization of the purpose, functional features and advantages of the present disclosure will be further explained in connection with the embodiments with reference to the accompanying drawings.

DETAILED DESCRIPTION

It should be understood that the specific embodiments described herein are intended to be explanatory only and are not intended to limit the present disclosure.

Figure 1:
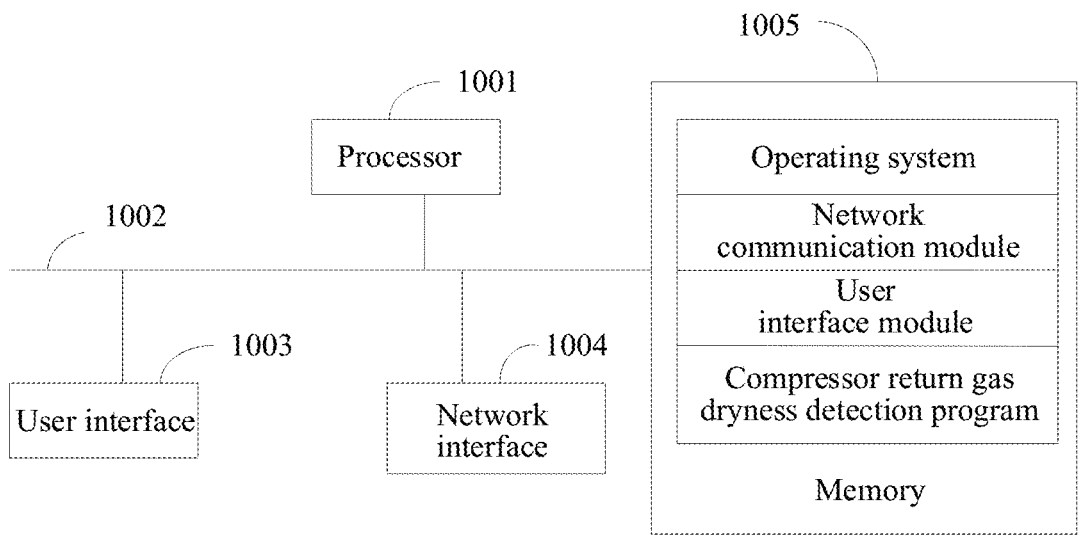
FIG. 1 is a schematic structural diagram illustrating a compressor return gas dryness detection device in a hardware operation environment according to an embodiment of the present disclosure.

Reference is made to FIG. 1. FIG. 1 is a schematic structural diagram of a compressor return gas dryness detection device in a hardware operating environment according to an embodiment of the present disclosure.

As shown in FIG. 1, the compressor return gas dryness detection device may include a processor 1001, such as a Central Processing Unit (CPU), a communication bus 1002, a user interface 1003, a network interface 1004, and a memory 1005. The communication bus 1002 is configured to realize connection and communication between these components. The user interface 1003 may include a display, and an input unit such as a key. The selectable user interface 1003 may further include a standard wired interface and a wireless interface. In some embodiments, the network interface 1004 may include a standard wired interface and a wireless interface (e.g., a WI-FI interface). The memory 1005 may be a high-speed Random Access Memory (RAM) memory, or a non-volatile memory such as a disk memory. In some embodiments, the memory 1005 may be a storage device independent of the processor 1001 described above.

Those skilled in the art will appreciate that the device configuration shown in FIG. 1 does not constitute a limitation on the compressor return gas dryness detection device. The compressor return gas dryness detection device may include more or fewer components than illustrated, or a combination of certain components, or different component arrangements.

As shown in FIG. 1, the memory 1005 as a storage medium may include an operating system, a network communication module, a user interface module, and a compressor return gas dryness detection program.

In the compressor return gas dryness detection device shown in FIG. 1, the network interface 1004 is mainly configured to connect an external network and perform a data communication with other network devices. The user interface 1003 is mainly configured to connect a user device and perform a data communication with the user device. The device according to the present disclosure invokes the compressor return gas dryness detection program stored in the memory 1005 through the processor 1001 and executes the compressor return gas dryness detection method provided by the embodiment of the present disclosure.

Based on the above hardware structure, an embodiment of the compressor return gas dryness detection method of the present disclosure is provided.

Figure 2:
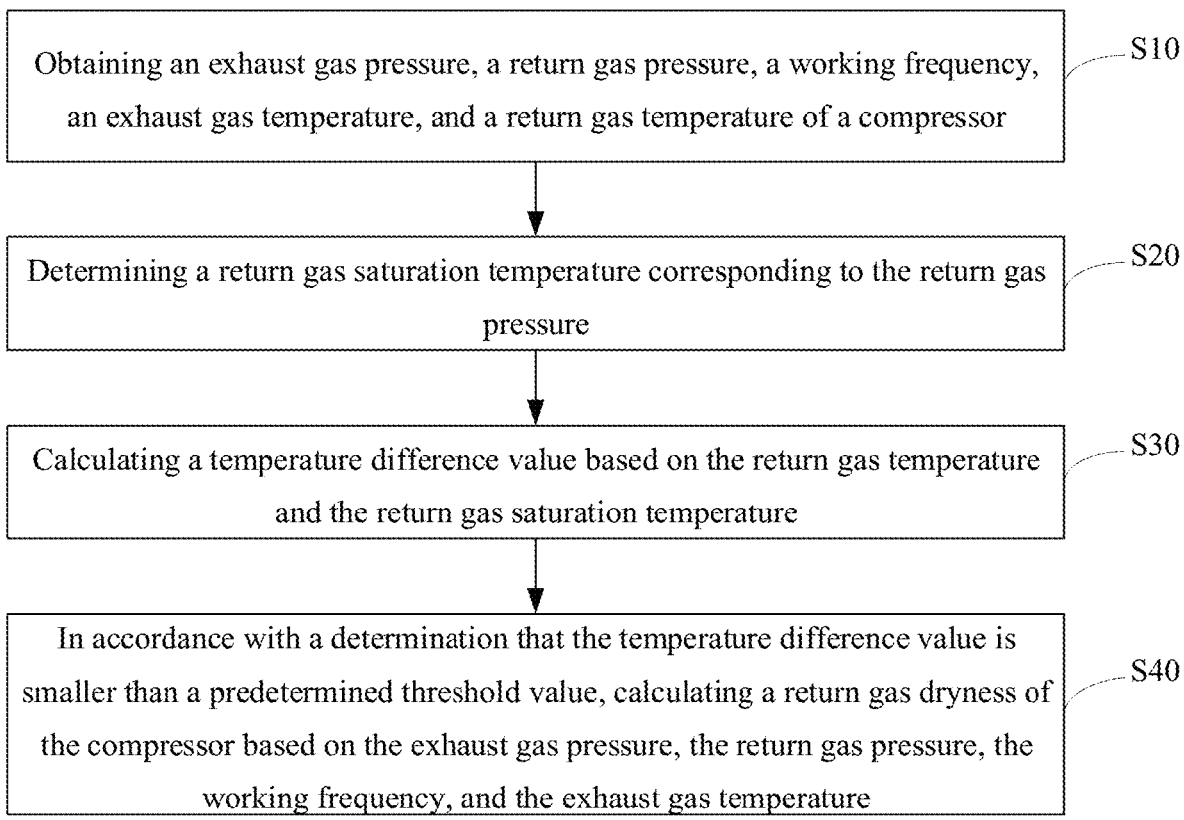
FIG. 2 is a flowchart illustrating a first embodiment of a compressor return gas dryness detection method according to the present disclosure.

Reference is made to FIG. 2. FIG. 2 is a flowchart illustrating a first embodiment of a compressor return gas dryness detection method according to the present disclosure.

In the first embodiment, the compressor return gas dryness detection method includes the following steps.

At step S10, an exhaust gas pressure, a return gas pressure, a working frequency, an exhaust gas temperature, and a return gas temperature of a compressor are obtained.

It should be noted that an executive entity of this embodiment may be a compressor return gas dryness detection device, such as a computer device, or other devices capable of realizing the same or similar functions. This embodiment is not limited to this, and the computer device will be described as an example in this embodiment.

Figure 3:
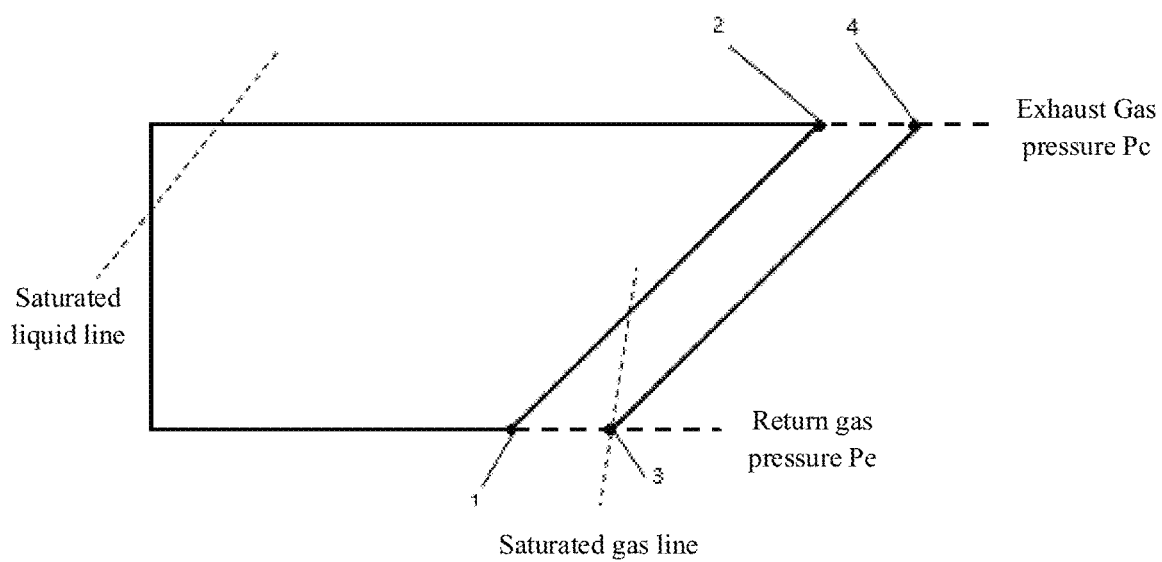
FIG. 3 is a pressure enthalpy diagram of a refrigeration compression cycle, where the suctioned gas carries liquid, of a compressor return gas dryness detection method according to an embodiment of the present disclosure.

It should be understood that as shown in FIG. 3, FIG. 3 is a pressure enthalpy diagram of a refrigeration compression cycle, where the suctioned gas carries liquid, where 3-4 represents a compression process of return gas saturation. However, due to the physical properties of R32 refrigerant, the temperature of an exhaust gas temperature point 4 will be 10 to 20° C. higher than that of R410a cycle, and may exceed a reliable operation range of a compressor under some working conditions, resulting in carbonization and cracking of refrigerant oil of the compressor, thus reducing lubrication effect and causing abnormal wear or even damage to the compressor. One of the solutions commonly used is a liquid-carrying return gas control of a process 1-2 as shown in the figure, which can effectively lower the exhaust gas temperature. However, it is very difficult to measure the amount of the liquid carried by the liquid-carrying return gas, i.e., the dryness x of the return gas. If the dryness is too small, a compressor liquid will be compressed and the compressor will be damaged.

It can be understood that the compressor is a compressor of an air conditioner. When the compressor is in a working state, the exhaust gas pressure, return gas pressure, working frequency, exhaust gas temperature, and return gas temperature of the compressor can be obtained, and the return gas dryness of the compressor can be detected through these compressor parameters.

Further, in order to obtain the compressor parameters more accurately, the step S10 includes: detecting the exhaust gas pressure of the compressor by an exhaust gas pressure sensor, and detecting the return gas pressure of the compressor by a return gas pressure sensor; detecting the exhaust gas temperature of the compressor by an exhaust gas temperature sensor, and detecting the return gas temperature of the compressor by a return gas temperature sensor; and obtaining a rotational speed of the compressor, and determining the working frequency of the compressor based on the rotational speed of the compressor.

It should be understood that the exhaust gas pressure sensor, the return gas pressure sensor, the exhaust gas temperature sensor, and the return gas temperature sensor can be set in advance, and an exhaust gas pressure Pc can be detected by the exhaust gas pressure sensor, a return gas pressure Pe can be detected by the return gas pressure sensor, an exhaust gas temperature T7c can be detected by the exhaust gas temperature sensor, and a return gas temperature T7 can be detected by the return gas temperature sensor.

It should be understood that the rotational speed of the compressor can also be detected and thus the rotational speed of the compressor is obtained; and then a working frequency INV of the compressor can be determined based on the rotational speed of the compressor.

At step S20, a return gas saturation temperature corresponding to the return gas pressure is determined.

It should be understood that return gas saturation temperatures corresponding to various return gas pressures are preset, and after a return gas pressure is detected currently, a return gas saturation temperature corresponding to the return gas pressure can be determined.

In the specific implementation, a plurality of return gas pressures to be selected and return gas saturation temperatures to be selected can be obtained first. Here, the return gas saturation temperatures to be selected are in one-to-one correspondence with the plurality of return gas pressures to be selected. A mapping list is established based on the return gas pressures to be selected and the return gas saturation temperatures to be selected, and a corresponding relationship between the return gas pressures to be selected and the return gas saturation temperatures to be selected is recorded in the mapping list.

It can be understood that after the return gas pressure Pe is detected, the return gas pressure can be matched with a return gas pressure to be selected in the mapping list, and a return gas saturation temperature Te corresponding to the return gas pressure Pe can be determined based on the matching result.

At step S30, a temperature difference value is calculated based on the return gas temperature and the return gas saturation temperature.

It should be understood that after the return gas temperature and the return gas saturation temperature are obtained, a magnitude relationship between the return gas temperature and the return gas saturation temperature can be obtained by comparison. In this embodiment, the magnitude relationship is determined by calculating the temperature difference value.

It can be understood that the temperature difference value can be calculated based on the return gas temperature T7 and the return gas saturation temperature Te, where the temperature difference value is expressed as T7−Te.

At step S40, a return gas dryness of the compressor is calculated based on the exhaust gas pressure, the return gas pressure, the working frequency, and the exhaust gas temperature in accordance with a determination that the temperature difference value is smaller than a predetermined threshold value.

It should be noted that the predetermined threshold value in this embodiment can be 1, and when the temperature difference value T7−TE is smaller than 1, it can be determined that the return gas carries a liquid, a return gas dryness calculation step under the condition of the return gas carrying a liquid can be entered, and the return gas dryness of the compressor can be calculated based on the exhaust gas pressure, the return gas pressure, the working frequency, and the exhaust gas temperature.

Further, other than the case where the return gas carries a liquid, there is a case where the return gas carries no liquid, and the method further includes, after the step S30: determining a predetermined return gas dryness as the return gas dryness of the compressor in accordance with a determination that the temperature difference value being greater than or equal to the predetermined threshold value.

It should be understood that when the temperature difference value T7−TE is greater than or equal to 1, the return gas can be determined to be purely gaseous without liquid, and the predetermined return gas dryness can be determined as the return gas dryness of the compressor, where the predetermined return gas dryness can be set as 1. Therefore, when the return gas is purely gaseous without liquid, the return gas dryness x is 1.

Further, the return gas dryness cannot be accurately measured in the related art, and if the return gas dryness is too small, the refrigerant oil of the compressor will be diluted and abnormal wear of the compressor will be caused. In view of this, the method further includes, after the step S40: generating an adjustment strategy based on the return gas dryness; and adjusting an operation state of the compressor based on the adjustment strategy, to control the return gas dryness of the compressor within a predetermined return gas dryness interval.

It should be understood that after the return gas dryness is calculated through the above steps, the adjustment strategy can be generated based on the current return gas dryness, and the operation state of the compressor can be adjusted based on the adjustment strategy. In this way, the return gas dryness of the compressor can be controlled within a reasonable range and the reliability of the compressor can be improved. Here, the predetermined return gas dryness interval is the reasonable range of the return gas dryness, and a specific value thereof can be predetermined by technical personnel, which will not be limited in this embodiment.

According to this embodiment, the exhaust gas pressure, the return gas pressure, the working frequency, the exhaust gas temperature, and the return gas temperature of the compressor are obtained; the return gas saturation temperature corresponding to the return gas pressure is determined; the temperature difference value is calculated based on the return gas temperature and the return gas saturation temperature; and the return gas dryness of the compressor is calculated based on the exhaust gas pressure, the return gas pressure, the working frequency, and the exhaust gas temperature in accordance with a determination that the temperature difference value is smaller than the predetermined threshold value. In this embodiment, the return gas saturation temperature corresponding to the return gas pressure is determined based on the return gas pressure, the temperature difference value is calculated based on the return gas temperature and the return gas saturation temperature, and the return gas dryness of the compressor is calculated based on the exhaust gas pressure, the return gas pressure, the working frequency, and the exhaust gas temperature in accordance with a determination that the temperature difference value is smaller than the predetermined threshold value. In this way, the return gas dryness of the compressor can be accurately calculated and the accuracy of the detection of the return gas dryness of the compressor can be improved.

Figure 4:
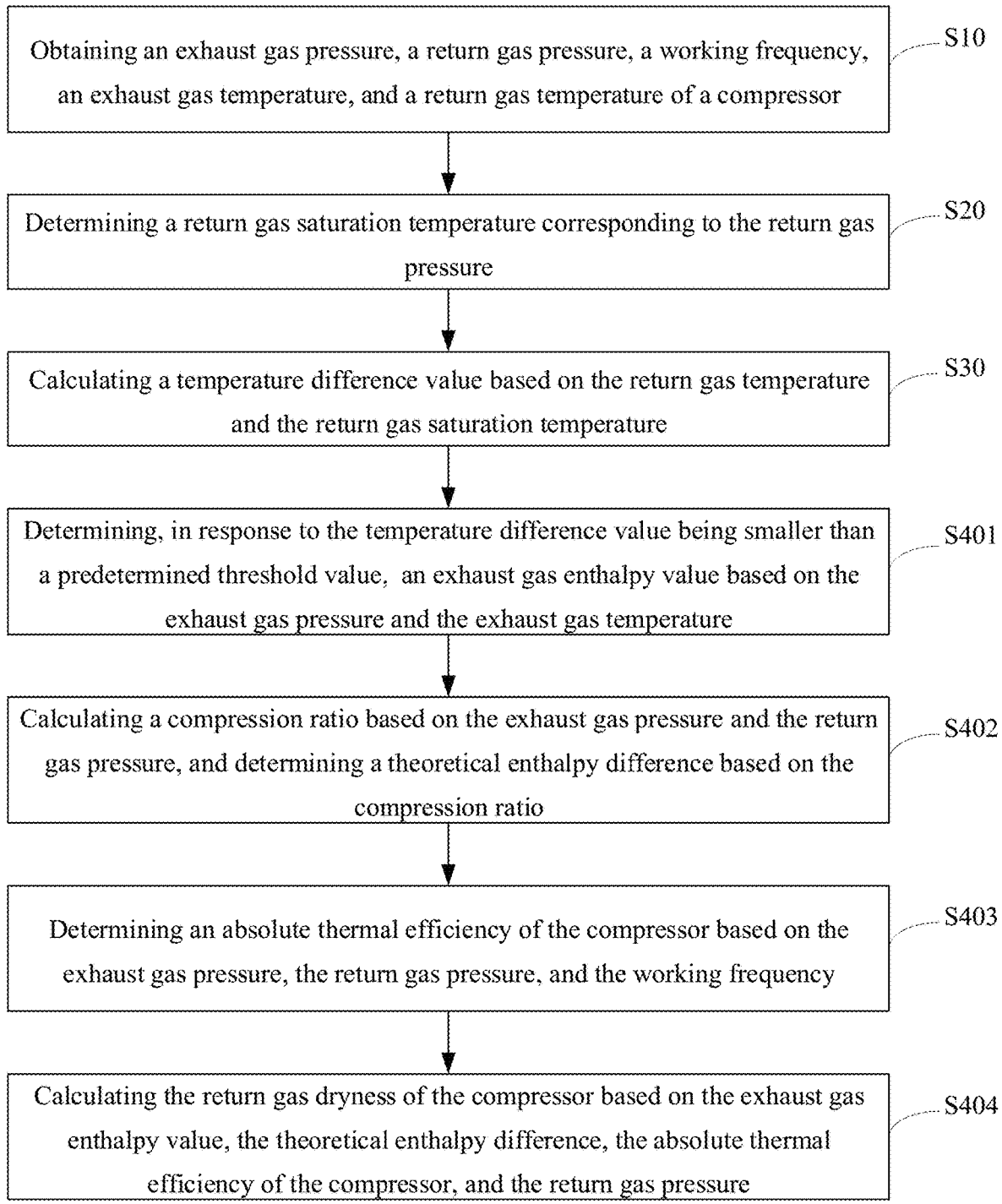
FIG. 4 is a flowchart illustrating a second embodiment of a compressor return gas dryness detection method according to the present disclosure.

In an embodiment, as shown in FIG. 4, a second embodiment of the compressor return gas dryness detection method according to the present disclosure is proposed based on the first embodiment. The step S40 includes the following steps.

At step S401, in accordance with a determination that the temperature difference value is smaller than a predetermined threshold value, an exhaust gas enthalpy value is determined based on the exhaust gas pressure and the exhaust gas temperature.

It should be understood that when the temperature difference value T7−TE is smaller than 1, it can be determined that the return gas carries a liquid, and the return gas dryness calculation step in the case where the return gas carries a liquid can be entered. First, the exhaust gas enthalpy value Ht7c of the exhaust gas can be obtained through calculation based on the exhaust gas pressure Pc and the exhaust gas temperature T7c. The exhaust gas enthalpy value can be calculated in accordance with the following formula:

$$Ht7c=f(pc,t7c),$$

where Ht7c represents the exhaust gas enthalpy value, Pc represents the exhaust gas pressure, and T7c represents the exhaust gas temperature.

At step S402, a compression ratio is calculated based on the exhaust gas pressure and the return gas pressure, and a theoretical enthalpy difference is determined based on the compression ratio.

It should be understood that the compression ratio Pr may be calculated based on the exhaust gas pressure Pc and the return gas pressure Pe. The compression ratio can be calculated by the following formula:

$$Pr=Pc/Pe,$$

where Pr represents the compression ratio, Pc represents the exhaust gas pressure, and Pe represents the return gas pressure.

It can be understood that, after the compression ratio is obtained, the theoretical enthalpy difference $\Delta h$ can be further determined based on the compression ratio. The theoretical enthalpy difference can be calculated by the following formula:

$$\Delta h=f(Pr);$$

where $\Delta h$ represents the theoretical enthalpy difference, and Pr represents the compression ratio.

At step S403, an absolute thermal efficiency of the compressor is determined based on the exhaust gas pressure, the return gas pressure, and the working frequency.

It should be understood that the absolute thermal efficiency $\eta i$ of the compressor can be obtained through fitting based on the exhaust gas pressure Pc, the return gas pressure Pe, and the working frequency INV. The absolute thermal efficiency of the compressor can be calculated by the following formula:

$$\eta i=f(Pe,Pc,INV),$$

where $\eta i$ represents the absolute thermal efficiency of the compressor, Pe represents the return gas pressure, Pc represents the exhaust gas pressure, and INV represents the working frequency.

At step S404, the return gas dryness of the compressor is calculated based on the exhaust gas enthalpy value, the theoretical enthalpy difference, the absolute thermal efficiency of the compressor, and the return gas pressure.

It should be understood that, after the exhaust gas enthalpy value, the theoretical enthalpy value, and the absolute thermal efficiency of the compressor are obtained through calculation in accordance with the above steps, the return gas dryness of the compressor can be calculated based on the exhaust gas enthalpy value, the theoretical enthalpy difference, the absolute thermal efficiency of the compressor, and the return gas pressure.

In this embodiment, the exhaust gas enthalpy value is determined based on the exhaust gas pressure and the exhaust gas temperature; the compression ratio is calculated based on the exhaust gas pressure and the return gas pressure; the theoretical enthalpy difference is determined based on the compression ratio; the absolute thermal efficiency of the compressor is determined based on the exhaust gas pressure, the return gas pressure, and the working frequency; and the return gas dryness of the compressor is calculated based on the exhaust gas enthalpy value, the theoretical enthalpy difference, the absolute thermal efficiency of the compressor, and the return gas pressure. In this way, the return gas dryness of the compressor can be obtained accurately.

Figure 5:
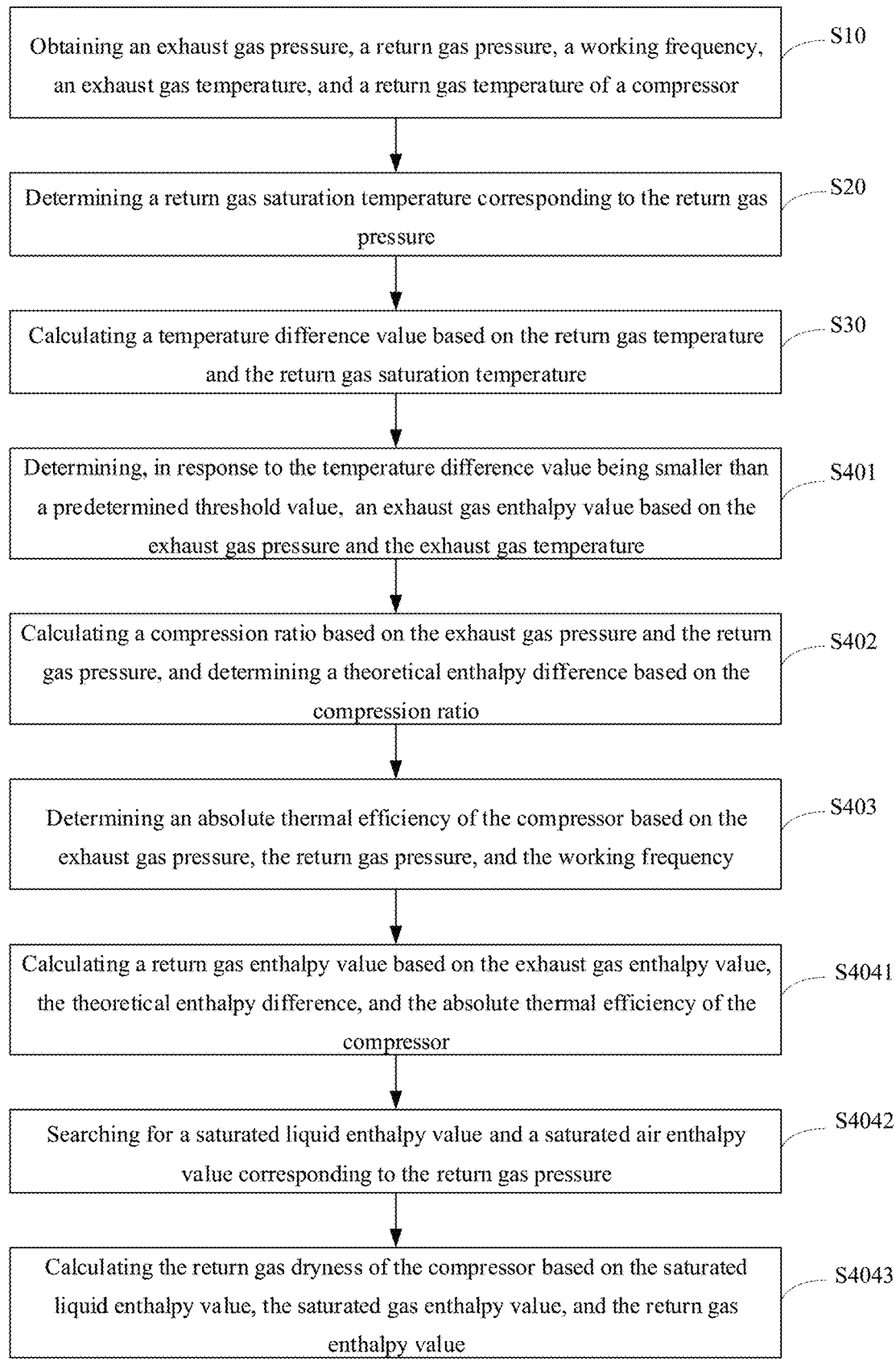
FIG. 5 is a flowchart illustrating a third embodiment of a compressor return gas dryness detection method according to the present disclosure.

In an embodiment, as shown in FIG. 5, a third embodiment of a compressor return gas dryness detection method according to the present disclosure is provided based on the first embodiment or the second embodiment. In this embodiment, the description is made based on the first embodiment, and the step S404 includes the following steps.

At step S4041, a return gas enthalpy value is calculated based on the exhaust gas enthalpy value, the theoretical enthalpy difference, and the absolute thermal efficiency of the compressor.

Figure 6:
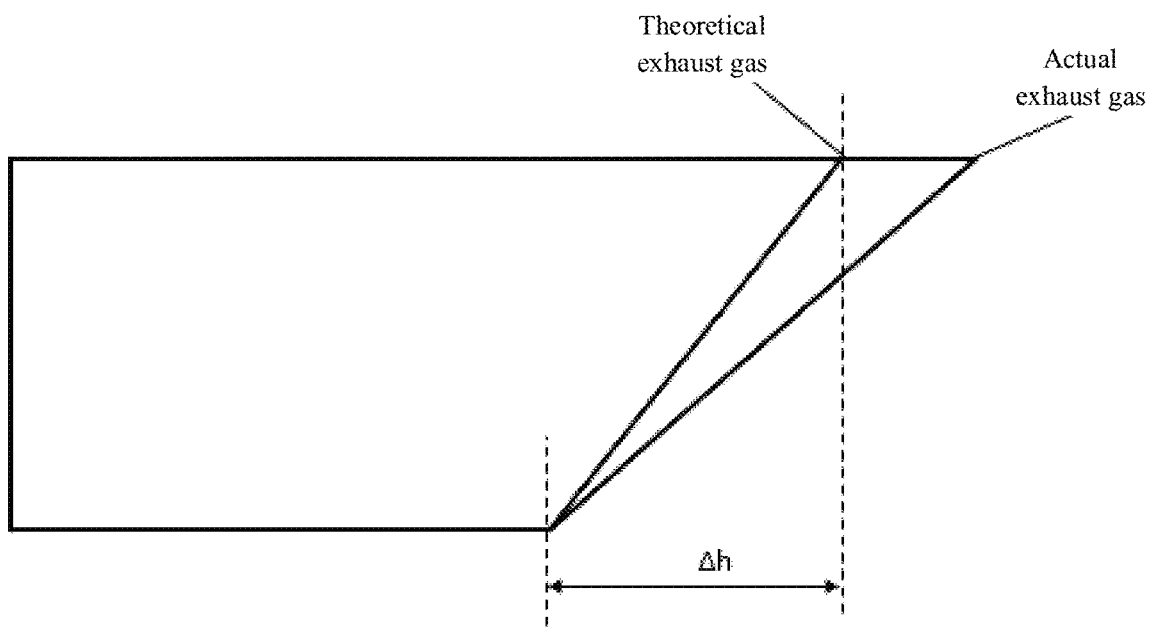
FIG. 6 is a schematic diagram illustrating an actual refrigeration compression cycle and a theoretical refrigeration compression cycle of a compressor return gas dryness detection method according to an embodiment of the present disclosure.

It should be understood that the theoretical enthalpy difference is, under adiabatic compression, a value of the exhaust gas enthalpy value minus the return gas enthalpy value, as shown in FIG. 6. FIG. 6 is a schematic diagram illustrating an actual refrigeration compression cycle and a theoretical refrigeration compression cycle. Therefore, the return gas enthalpy value Ht7 can be calculated based on the exhaust gas enthalpy value Ht7c, the theoretical enthalpy difference $\Delta h$, and the absolute thermal efficiency $\eta i$ of the compressor. The return gas enthalpy value can be calculated by the following formula:

$$Ht7 = Ht7c - \Delta h / \eta i,$$

where Ht7 represents the return gas enthalpy value, Ht7c represents the exhaust gas enthalpy value, $\Delta h$ represents the theoretical enthalpy difference, and $\eta i$ represents the absolute thermal efficiency of the compressor.

At step S4042, a saturated liquid enthalpy value and a saturated gas enthalpy value that correspond to the return gas pressure are searched for.

It should be understood that after the return gas enthalpy value is obtained through calculation, the return gas dryness of the compressor can be further calculated based on the return gas pressure and the return gas enthalpy value.

It can be understood that the saturated liquid enthalpy value and saturated gas enthalpy value corresponding to the return gas pressure can be searched for, and the return gas dryness of the compressor is calculated based on the saturated liquid enthalpy value, the saturated gas enthalpy value, and the return gas enthalpy value.

It should be understood that the saturated liquid enthalpy value Hpe_liq under the return gas pressure can be searched for, and the saturated gas enthalpy value Hpe_gas under the return gas pressure can be searched for. The corresponding relationship between the saturated liquid enthalpy value and the return gas pressure and the corresponding relationship between the saturated gas enthalpy value and the return gas pressure can be set in advance. Therefore, after the return gas pressure is determined, the saturated liquid enthalpy value and the saturated gas enthalpy value corresponding to the return gas pressure can be determined through the return gas pressure.

At step S4043, the return gas dryness of the compressor is calculated based on the saturated liquid enthalpy value, the saturated gas enthalpy value, and the return gas enthalpy value.

It can be understood that after the saturated liquid enthalpy value and the saturated gas enthalpy value are determined, the return gas dryness of compressor can be calculated based on the saturated liquid enthalpy value, the saturated gas enthalpy value, and the return gas enthalpy value.

Further, said calculating the return gas dryness of the compressor based on the saturated liquid enthalpy value, the saturated gas enthalpy value, and the return gas enthalpy value includes: calculating, based on the saturated liquid enthalpy value, the saturated gas enthalpy value, and the return gas enthalpy value, the return gas dryness of the compressor in accordance with a predetermined return gas dryness formula:

$$X = (Ht7 - Hpe\_liq) / (Hpe\_gas - Hpe\_liq),$$

where x represents the return gas dryness of the compressor, Ht7 represents the return gas enthalpy value, Hpe_liq represents the saturated liquid enthalpy value, and Hpe_gas represents the saturated gas enthalpy value.

In this embodiment, the return gas enthalpy value is calculated based on the exhaust enthalpy value, the theoretical enthalpy difference, and the absolute thermal efficiency of the compressor; the saturated liquid enthalpy value and saturated gas enthalpy value corresponding to the return gas pressure are searched for; and the return gas dryness of the compressor is calculated based on the saturated liquid enthalpy value, the saturated gas enthalpy value, and the return gas enthalpy value. In this way, the return gas enthalpy value is first calculated accurately, and then the return gas dryness is calculated based on the return gas enthalpy value, thus further improving the accuracy of the return gas dryness.

In addition, an embodiment of the present disclosure also provides a storage medium. The storage medium has a compressor return gas dryness detection program stored thereon. The compressor return gas dryness detection program, when executed by a processor, implements steps of the compressor return gas dryness detection method described above.

Since the storage medium adopts all the technical solutions of the above-mentioned embodiments, it has at least all the beneficial effects brought by the technical solutions of the above-mentioned embodiments, which will not be repeated here.

Figure 7:
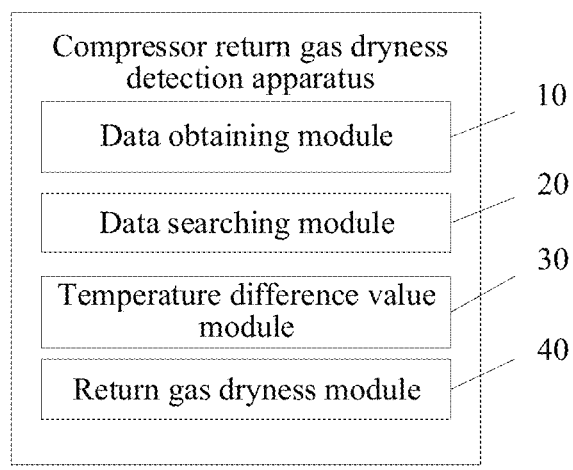
FIG. 7 is a functional module diagram of a first embodiment of a compressor return gas dryness detection apparatus according to the present disclosure.

In addition, referring to FIG. 7, the embodiment of the present disclosure also provides a compressor return gas dryness detection apparatus. The compressor return gas dryness detection apparatus includes: a data obtaining module 10, a data searching module 20, a temperature difference value module 30, and a return gas dryness module 40.

The data obtaining module 10 is configured to obtain an exhaust gas pressure, a return gas pressure, a working frequency, an exhaust gas temperature, and a return gas temperature of a compressor.

The data searching module 20 is configured to determine a return gas saturation temperature corresponding to the return gas pressure.

The temperature difference value module 30 is configured to calculate a temperature difference value based on the return gas temperature and the return gas saturation temperature.

The return gas dryness module 40 is configured to calculate, in accordance with a determination that the temperature difference value is smaller than a predetermined threshold value, a return gas dryness of the compressor based on the exhaust gas pressure, the return gas pressure, the working frequency, and the exhaust gas temperature.

According to this embodiment, the exhaust gas pressure, the return gas pressure, the working frequency, the exhaust gas temperature, and the return gas temperature of the compressor are obtained; the return gas saturation temperature corresponding to the return gas pressure is determined; the temperature difference value is calculated based on the return gas temperature and the return gas saturation temperature; and the return gas dryness of the compressor is calculated based on the exhaust gas pressure, the return gas pressure, the working frequency, and the exhaust gas temperature in accordance with a determination that the temperature difference value is smaller than the predetermined threshold value. In this embodiment, the return gas saturation temperature corresponding to the return gas pressure is determined based on the return gas pressure, the temperature difference value is calculated based on the return gas temperature and the return gas saturation temperature, and the return gas dryness of the compressor is calculated based on the exhaust gas pressure, the return gas pressure, the working frequency, and the exhaust gas temperature in accordance with a determination that the temperature difference value is smaller than the predetermined threshold value. In this way, the return gas dryness of the compressor can be accurately calculated and the accuracy of the detection of the return gas dryness of the compressor can be improved.

In an embodiment, the return gas dryness module 40 is further configured to determine a predetermined return gas dryness as the return gas dryness of the compressor in accordance with a determination that the temperature difference value being greater than or equal to the predetermined threshold value.

In an embodiment, the return gas dryness module 40 is further configured to determine an exhaust gas enthalpy value based on the exhaust gas pressure and the exhaust gas temperature; calculate a compression ratio based on the exhaust gas pressure and the return gas pressure, and determining a theoretical enthalpy difference based on the compression ratio; determine an absolute thermal efficiency of the compressor based on the exhaust gas pressure, the return gas pressure, and the working frequency; and calculate the return gas dryness of the compressor based on the exhaust gas enthalpy value, the theoretical enthalpy difference, the absolute thermal efficiency of the compressor, and the return gas pressure.

In an embodiment, the return gas dryness module 40 is further configured to calculate a return gas enthalpy value based on the exhaust gas enthalpy value, the theoretical enthalpy difference, and the absolute thermal efficiency of the compressor, and calculate the return gas dryness of the compressor based on the return gas pressure and the return gas enthalpy value.

In an embodiment, the return gas dryness module 40 is further configured to search for a saturated liquid enthalpy value and a saturated gas enthalpy value that correspond to the return gas pressure, and calculate the return gas dryness of the compressor based on the saturated liquid enthalpy value, the saturated gas enthalpy value, and the return gas enthalpy value.

In an embodiment, the return gas dryness module 40 is further configured to calculate, based on the saturated liquid enthalpy value, the saturated gas enthalpy value, and the return gas enthalpy value, the return gas dryness of the compressor in accordance with a predetermined return gas dryness formula:

$$X=(Ht7-Hpe\_liq)/(Hpe\_gas-Hpe\_liq),$$

where x represents the return gas dryness of the compressor, Ht7 represents the return gas enthalpy value, Hpe_liq represents the saturated liquid enthalpy value, and Hpe_gas represents the saturated gas enthalpy value.

In an embodiment, the data obtaining module 10 is further configured to: detect the exhaust gas pressure of the compressor by an exhaust gas pressure sensor, and detect the return gas pressure of the compressor by a return gas pressure sensor; detect the exhaust gas temperature of the compressor by an exhaust gas temperature sensor, and detect the return gas temperature of the compressor by a return gas temperature sensor; and obtain a rotational speed of the compressor, and determine the working frequency of the compressor based on the rotational speed of the compressor.

In an embodiment, the compressor return gas dryness detection apparatus further includes a compressor adjustment module configured to: generate an adjustment strategy based on the return gas dryness; and adjust an operation state of the compressor based on the adjustment strategy, to control the return gas dryness of the compressor within a predetermined return gas dryness interval.

For other embodiments or specific implementations of the compressor return gas dryness detection apparatus of the present disclosure, reference can be made to the above-mentioned method embodiments, which will not be repeated here.

It should be noted that herein, the terms "comprise", "include" or any other variants thereof are intended to cover non-exclusive inclusion, so that the process, method, article or device including a series of elements not only includes those elements, but also includes other elements that are not explicitly listed or also includes the inherent elements of the process, method, article or device. In the case that there are no more restrictions, an element defined by the statement "comprises/includes a" does not exclude the presence of additional identical elements in the process, method, article or device that comprises said element.

The above serial numbers of the embodiments of the present disclosure are for description only and do not represent the advantages or disadvantages of the embodiments.

According to the above description of the embodiments, it will be clear to those skilled in the art that the method of the above embodiments can be implemented by means of software plus the necessary common hardware platform, and of course alternatively by means of hardware, but in many cases the former is a preferred implementation. Based on this understanding, the technical solution of the present disclosure in essence or a part thereof that contributes to the related art can be implemented in the form of software products. The computer software product is stored in a computer-readable storage medium (e.g., ROM/RAM, magnetic disk, optical disk) as described above, including instructions for causing a smart device (which may be a mobile phone, a computer, a compressor return gas dryness detection device, an air conditioner, or a network compressor return gas dryness detection device, etc.) to perform the methods described in various embodiments of the present disclosure.

The above are only preferred embodiments of the present disclosure, and are not therefore limiting the scope of the present disclosure. Any equivalent structure or equivalent process transformation made by using the contents of the description and drawings of the present disclosure, or direct or indirect applications in other related technical fields are equally included in the claimed scope of the present disclosure.

What is claimed is:

1. A compressor return gas dryness detection method, comprising:
   obtaining an exhaust gas pressure of a compressor, a return g gas as pressure of the compressor, a working frequency of the compressor, an exhaust gas temperature of the compressor, and a return gas temperature of the compressor;
   determining a return gas saturation temperature corresponding to the return gas pressure;
   calculating a temperature difference value based on the return gas temperature and the return gas saturation temperature;
   in accordance with a determination that the temperature difference value is smaller than a predetermined threshold value, calculating a return dryness of the compressor based on the exhaust gas pressure, the return gas pressure, the working frequency, and the exhaust gas temperature; and
   subsequent to calculating the temperature difference value based on the return gas temperature and the return gas saturation temperature:
   in accordance with a determination that the temperature difference value is greater than or equal to the predetermined threshold value, determining a predetermined return gas dryness as the return gas dryness of the compressor;
   generating an adjustment strategy based on the return gas dryness of the compressor; and
   adjusting an operation state of the compressor based on the adjustment strategy to modify the return gas dryness of the compressor to within a predetermined return gas dryness range.

2. The compressor return gas dryness detection method according to claim 1, wherein calculating the return gas dryness of the compressor based on the exhaust gas pressure, the return gas pressure, the working frequency, and the exhaust gas temperature comprises:
   determining an exhaust gas enthalpy value based on the exhaust gas pressure and the exhaust gas temperature;
   calculating a compression ratio based on the exhaust gas pressure and the return gas pressure, and determining a theoretical enthalpy difference based on the compression ratio;
   determining an absolute thermal efficiency of the compressor based on the exhaust gas pressure, the return gas pressure, and the working frequency; and
   calculating the return gas dryness of the compressor based on the exhaust gas enthalpy value, the theoretical enthalpy difference, the absolute thermal efficiency of the compressor, and the return gas pressure.

3. The compressor return gas dryness detection method according to claim 2, wherein calculating the return gas dryness of the compressor based on the exhaust gas enthalpy value, the theoretical enthalpy difference, the absolute thermal efficiency of the compressor, and the return gas pressure comprises:
   calculating a return gas enthalpy value based on the exhaust gas enthalpy value, the theoretical enthalpy difference, and the absolute thermal efficiency of the compressor;
   searching for a saturated liquid enthalpy value and a saturated gas enthalpy value that correspond to the return gas pressure; and
   calculating the return gas dryness of the compressor based on the saturated liquid enthalpy value, the saturated gas enthalpy value, and the return gas enthalpy value.

4. The compressor return gas dryness detection method according to claim 3, wherein calculating the return gas dryness of the compressor based on the saturated liquid enthalpy value, the saturated gas enthalpy value, and the return gas enthalpy value comprises:
   calculating, based on the saturated liquid enthalpy value, the saturated gas enthalpy value, and the return gas enthalpy value, the return gas dryness of the compressor in accordance with a predetermined return gas dryness formula:

$X = (Ht7 - Hpe\_liq)/(Hpe\_gas - Hpe\_liq)$, where x represents the return gas dryness of the compressor, Ht7 represents the return gas enthalpy value, Hpe_liq represents the saturated liquid enthalpy value, and Hpe_gas represents the saturated gas enthalpy value.

5. The compressor return gas dryness detection method according to claim 1, further comprising, subsequent to calculating, in accordance with a determination that the temperature difference value is smaller than the predetermined threshold value, the return gas dryness of the compressor based on the exhaust gas pressure, the return gas pressure, the working frequency, and the exhaust gas temperature:
   generating an adjustment strategy based on the return gas dryness; and
   adjusting an operation state of the compressor based on the adjustment strategy, to control the return gas dryness of the compressor within a predetermined return gas dryness interval.

6. The compressor return gas dryness detection method according to claim 1, wherein obtaining the exhaust gas pressure, the return gas pressure, the working frequency, the exhaust gas temperature, and the return gas temperature of the compressor comprises:
   detecting the exhaust gas pressure of the compressor by an exhaust gas pressure sensor, and detecting the return gas pressure of the compressor by a return gas pressure sensor;
   detecting the exhaust gas temperature of the compressor by an exhaust gas temperature sensor, and detecting the return gas temperature of the compressor by a return gas temperature sensor; and
   obtaining a rotational speed of the compressor, and determining the working frequency of the compressor based on the rotational speed of the compressor.

7. A compressor return gas dryness detection device, comprising:
   a memory;
   a processor; and
   a compressor return gas dryness detection program stored on the memory and executable on the processor, the compressor return gas dryness detection program comprising instructions that, when executed by the processor, cause the processor to perform operations of the compressor return gas dryness detection method according to claim 1.

8. A compressor return gas dryness detection apparatus, comprising:
   a data obtaining module configured to obtain an exhaust gas pressure, a return gas pressure, a working frequency, an exhaust gas temperature, and a return gas temperature of a compressor;

a data searching module configured to determine a return gas saturation temperature corresponding to the return gas pressure;

a temperature difference value module configured to calculate a temperature difference value based on the return gas temperature and the return gas saturation temperature; and a return gas dryness module configured to calculate, in accordance with a determination that the temperature difference value is smaller than a predetermined threshold value, a return gas dryness of the compressor based on the exhaust gas pressure, the return gas pressure, the working frequency, and the exhaust gas temperature; and subsequent to calculating the temperature difference value based on the return gas temperature and the return gas saturation temperature:

in accordance with a determination that the temperature difference value is greater than or equal to the predetermined threshold value, determining a predetermined return gas dryness as the return gas dryness of the compressor;

generating an adjustment strategy based on the return gas dryness of the compressor; and adjusting an operation state of the compressor based on the adjustment strategy to modify the return gas dryness of the compressor to within a predetermined return gas dryness range.

9. A non-transitory computer-readable storage medium, storing a compressor return gas dryness detection computer program, when executed by a processor, cause the processor to perform operations comprising: obtaining an exhaust gas pressure, a return gas pressure, a working frequency, an exhaust gas temperature, and a return gas temperature of a compressor;

determining a return gas saturation temperature corresponding to the return gas pressure;

calculating a temperature difference value based on the return gas temperature and the return gas saturation temperature;

in accordance with a determination that the temperature difference value is smaller than a predetermined threshold value, calculating a return gas dryness of the compressor based on the exhaust gas pressure, the return gas pressure, the working frequency, and the exhaust gas temperature; and subsequent to calculating the temperature difference value based on the return gas temperature and the return gas saturation temperature:

in accordance with a determination that the temperature difference value is greater than or equal to the predetermined threshold value, determining a predetermined return gas dryness as the return gas dryness of the compressor;

generating an adjustment strategy based on the return gas dryness of the compressor; and adjusting an operation state of the compressor based on the adjustment strategy to modify the return gas dryness of the compressor to within a predetermined return gas dryness range.

* * * * *